Figure 1:
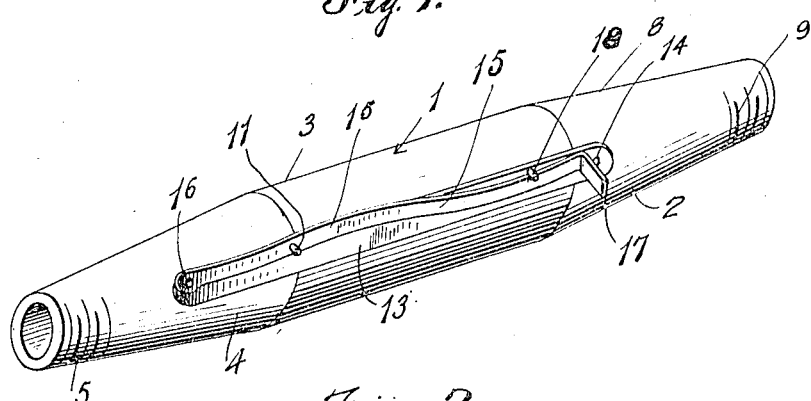

J. M. ROBERTS.
PIPE COUPLING.
APPLICATION FILED JULY 13, 1917.

1,256,369.

Patented Feb. 12, 1918.

Witnesses
E. A. R. Stanton
J. T. Dowling

Inventor
J. M. Roberts
By
Attorney

UNITED STATES PATENT OFFICE.

JAMES M. ROBERTS, OF MARION, KENTUCKY.

PIPE-COUPLING.

1,256,369.  Specification of Letters Patent.  Patented Feb. 12, 1918.

Application filed July 13, 1917. Serial No. 180,433.

*To all whom it may concern:*

Be it known that I, JAMES M. ROBERTS, a citizen of the United States, residing at Marion, in the county of Crittenden and State of Kentucky, have invented certain new and useful Improvements in Pipe-Couplings; and I do hereby declare the following to be a full, clear, and exact description of the invention, such as will enable others skilled in the art to which it appertains to make and use the same.

This invention relates to improvements in pipe couplings.

The object of this invention is to provide a pipe coupling including male and female sections and the male sections equipped with novel means whereby the sections may be quickly and easily coupled together and held in this coupled position against accidental displacement with relation to each other.

A further object of this invention is to provide a coupling equipped with novel coupling means whereby the sections of the coupling may be moved into coupling position and held in this position by novel coupling means.

A still further object of this invention is to provide a pipe coupling of this character, which is equipped with male and female sections, the male section provided with links at diametrically opposite points, which have pivotally secured to their free ends, levers, and the links and levers equipped with novel means coöperating with lugs carried by the female section for holding the sections in coupled position.

A still further object of this invention is to provide a pipe coupling of this character, which will be simple, practical and comparatively inexpensive in construction, and one that can be manufactured and sold at a low cost.

With these and other objects in view, the invention consists in the novel combination and arrangement of parts hereinafter more fully described and set forth in the claims hereto appended.

Figure 2:
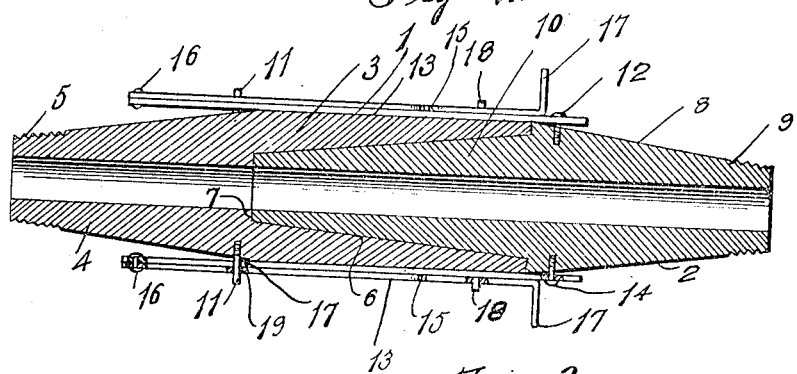
Figure 3:
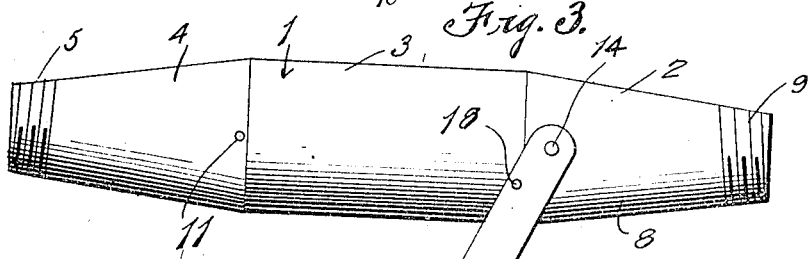
Figure 3:
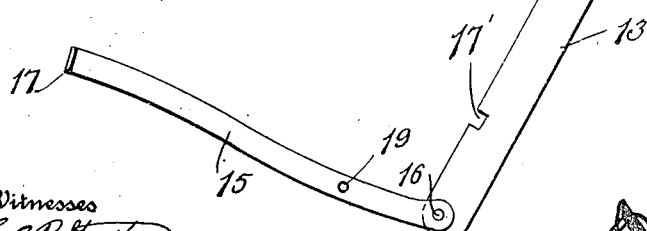

In the drawing:

Figure 1 is a perspective view of the pipe coupling in coupled position and as made in accordance with this invention, Fig. 2 is a longitudinal sectional view taken through the same in coupled position, Fig. 3 is a side elevation illustrating the coupling sections together and showing the coupling mechanism in extended position.

Referring to the drawing, the numeral 1 indicates the female section and 2 the male section.

The female section comprises a cylindrical body 3, provided with a frusto-conical extension 4 at one end, which extension terminates into an exteriorly screwthreaded cylindrical nipple 5, which nipple facilitates the securing of the same into a hose or pipe section or other connection. The opposite end of the cylindrical body 3 is provided with an inwardly extending tapered bore 6, which bore has its inner end terminating at the point of juncture of the frusto-conical extension with the body, thereby forming an annular interiorly arranged shoulder 7, which may constitute a seat for a rubber gasket or the like.

The male member 2 comprises the frusto-conical body 8 having one end terminating into an exteriorly screwthreaded cylindrical nipple 9, which facilitates the securing of the male section to a hose, pipe or other connection. The opposite end or enlarged end of the body 8 is provided with a tapered extension 10, which is adapted to be removably fitted into the tapered bore 6 of the female member and has its inner end abutting the shoulder 7 or against a washer which may be arranged against the shoulder 7, thereby forming a water tight connection between the two sections when coupled together.

The frusto-conical extension of the female member is provided adjacent its point of juncture with the cylindrical body and at diametrically opposite points with laterally extending lugs 11. The frusto-conical body of the male member is provided adjacent its enlarged end and at diametrically opposite points with laterally extending lugs 12.

A pair of links 13 have one of their ends pivotally secured to the lugs 12 of the male member as at 14. The free ends of the links have pivotally secured thereto one end of the levers 15 as at 16. The free ends of the levers are bent angularly in opposite directions to provide manipulating fingers 17, which fingers serve to move the links and levers into locking engagement for holding the pipe sections of the pipe in coupled position.

Each of the links 13 is provided with a substantially rectangular opening 17', which opens out through one longitudinal edge thereof. The openings are disposed so that they open out through opposite longitudinal edges.

The links are each provided adjacent their pivoted ends with the male member with cylindrical projections 18 and each projection of its respective link is located on the same side with the rectangular opening in the respective link.

The levers are each provided adjacent their pivoted connection with their respective links with an opening 19, which opening of each of the levers are adapted to receive its respective lug 11 of the female section when the pipe sections are in coupled position. The lugs 11 are first moved into the openings 17' of its respective lever and the levers are then swung on their pivoted points and the openings 17 receive the projecting ends of the lugs 11 and the levers are then further swung behind the lugs or projections 18, thereby holding the sections in coupled position. When it is desired to uncouple the sections, it is only necessary to grasp the manipulating fingers of each of the levers and move the same out of engagement with its respective projection and give a slight upward movement of the same, removing the opening 19 from the lug 11, thus permitting the respective links to be moved out of engagement with the lugs and by applying axial pressure to each of the sections, they may be readily and quickly uncoupled.

It is to be understood that the links and levers may be secured to any suitable pipe sections in the manner described, thus not limiting applicant to the specific construction as described.

What is claimed is:

1. A pipe coupling comprising sections, links pivoted to one of the sections, lugs carried by the other section and receiving the links, and locking means pivotally secured to the links and engaging the lugs for holding the links thereon and the sections in coupled position.

2. A pipe coupling comprising sections, diametrically opposed lugs carried by one of said sections, links pivotally secured to the other section at diametrically opposite points and adapted to move into engagement with the lugs of the other section, and levers pivotally secured to the links and provided with means engaging said lugs for holding the sections in coupled position.

3. A pipe coupling comprising sections, lugs carried by one of the sections, links pivotally secured to the other section, said links adapted to be moved into engagement with the lugs, levers pivotally secured to the links and engaging the lugs, and means carried by the links adapted to receive the levers for holding the levers against accidental displacement with relation to the links and holding the sections coupled.

4. A pipe coupling comprising male and female sections, links pivotally secured to the male section, lugs carried by the female section, means formed in the links for receiving the lugs for holding the links in engagement therewith, and levers pivotally secured to the free ends of the links and provided with means for receiving the lugs for holding the sections against accidental disengagement with one another.

5. A pipe coupling comprising male and female sections, diametrically opposed lugs formed integrally with the female section, links pivotally secured to the male section at diametrically opposite points, and provided with openings in their side longitudinal edges to receive the lugs of the female member, levers pivotally secured to the free ends of the links, said lever provided with openings for receiving the lugs of the female section, and projections formed integrally with and extending laterally from the links to receive the side longitudinal edges of the levers for holding the sections in coupled position.

6. A pipe coupling comprising male and female sections, said female section comprising a cylindrical body having one end provided with frusto-conical extensions terminating into an exteriorly screwthreaded nipple, the opposite end of the body provided with an inwardly extending tapered bore terminating at the point of juncture of the extensions with the body, forming an annular gasket seat, said male section comprising a frusto-conical body having its apex terminating into a cylindrical screwthreaded nipple, a hollow tapered extension formed integrally with the enlarged end of the frusto-conical body and adapted to be removably arranged in the tapered bore of the female section, and links pivotally secured to the male member and provided with means for engaging the female member for holding the male and female sections in coupled relation with one another.

7. A pipe coupling comprising male and female sections, the female section provided with a cylindrical body having one end provided with a frusto-conical extension terminating in a cylindrical exteriorly screwthreaded nipple, the opposite end of the body provided with an inwardly extending tapered bore, said male section comprising a frusto-conical body having its apex terminating into a cylindrical screwthreaded nipple, a hollow extension formed integrally with and extending from the enlarged end of the body, and adapted to be removably arranged in the tapered bore of the female section, links pivotally secured to the frusto-conical body of the male member at diametrically opposite points, and diametrically opposed lugs formed integrally with the tapered extension of the female member, means formed in the links for receiving the lugs of the female section, levers pivotally secured to the free ends of the links, said levers provided with openings for receiving the lugs of the female section for holding the links in engagement therewith, and projections formed integrally with the exterior of the links adjacent their point of connection with the male member for receiving the levers for holding the sections in coupled position.

In testimony whereof I affix my signature in presence of two witnesses.

JAMES M. ROBERTS.

Witnesses:
 NEIL GUESS,
 KATHERINE YANDELL.

Copies of this patent may be obtained for five cents each, by addressing the "Commissioner of Patents, Washington, D. C."